(12) United States Patent
Ohtsu et al.

(10) Patent No.: US 10,955,660 B2
(45) Date of Patent: Mar. 23, 2021

(54) OPTICAL ELEMENT WITH LIGHT SHIELDING AREA, AND IMAGING LENS

(71) Applicant: KANTATSU CO., LTD., Yaita (JP)

(72) Inventors: Nobuyuki Ohtsu, Sukagawa (JP); Koji Yoshikawa, Sukagawa (JP)

(73) Assignee: KANTATSU CO., LTD., Tochigi (JP)

(*) Notice: Subject to any disclaimer, the term of this patent is extended or adjusted under 35 U.S.C. 154(b) by 0 days.

(21) Appl. No.: 16/185,977

(22) Filed: Nov. 9, 2018

(65) Prior Publication Data
US 2019/0317318 A1    Oct. 17, 2019

(30) Foreign Application Priority Data
Nov. 10, 2017   (JP) .............................. JP2017-217548

(51) Int. Cl.
*G02B 27/00* (2006.01)
(52) U.S. Cl.
CPC ................................ *G02B 27/0018* (2013.01)
(58) Field of Classification Search
CPC .......... G02B 1/118; G02B 1/12; G02B 5/003; G02B 5/005; G02B 5/02; G02B 5/0236; G02B 5/0242; G02B 5/0247; G02B 5/0273; G02B 5/0278; G02B 5/0284; G02B 5/0294; G02B 21/00; G02B 21/0004; G02B 21/0032; G02B 27/0018
USPC ....... 359/559, 601, 613, 614, 362, 363, 368, 359/369, 642, 707, 722, 723, 738, 739, 359/740
See application file for complete search history.

(56) References Cited

U.S. PATENT DOCUMENTS

| | | | |
|---|---|---|---|
| 8,213,094 B2* | 7/2012 | Hirabayashi | ....... G02B 27/0018 359/738 |
| 2015/0077839 A1* | 3/2015 | Mizukane | ............. C03B 11/082 359/355 |
| 2017/0176649 A1 | 6/2017 | Chang | |
| 2019/0084255 A1* | 3/2019 | Hanano | .................... G02B 7/02 |

* cited by examiner

*Primary Examiner* — Arnel C Lavarias
(74) *Attorney, Agent, or Firm* — Hamre, Schumann, Mueller & Larson, P.C.

(57) ABSTRACT

There is provided an optical element, an imaging lens and an imaging device preventing from occurring ghosts and flares caused by unnecessary light reflected on a surface of the edge part or inside the same of the optical element, and reproducing a clear image quality.
The optical element 100 includes an effective optical portion 101, 103 and an edge part 102, 104 forming at the circumference of the effective optical portion 101, 103. A light shielding area SSI which changes in quality by laser irradiation is provided from a surface to the inside of the edge part or the inside of the same.

13 Claims, 9 Drawing Sheets

OPTICAL ELEMENT WITH LIGHT SHIELDING AREA, AND IMAGING LENS

The present application is based on and claims priority of a Japanese patent application No. 2017-217548 filed on Nov. 10, 2017, the entire contents of which are hereby incorporated by reference.

BACKGROUND OF THE INVENTION

Field of the Invention

The present application relates to an optical element used in an imaging device, and also relates to an imaging lens using the optical element.

Description of the Related Art

In recent years, it becomes common that camera function is mounted in various products including information terminal equipment.

The camera mounted in such equipment and devices is required to have an imaging lens which is capable of reducing ghosts and flares and taking clear images. In order to reduce the ghosts and flares, it is necessary to shield unnecessary lights which do not contribute to form an image.

As a Conventional art, a lens for shielding unnecessary lights disclosed in Patent Document 1 (US2017/0176649A1) has been known Patent Document 1 discloses an imaging lens module including a plurality of lens elements of which at least one lens element is a plastic lens. Therein, at least one surface of an object-side surface or an image-side surface of the plastic lens of the plurality of the lens elements is provided with a fitting part for fitting other lens which is formed so as to surround the circumference of an effective optical portion. Furthermore, coating for absorbing lights is carried out to an area connecting the effective optical portion and the fitting part, reflected stray light is controlled, and quality of images are improved. Additionally, the imaging lens is disclosed which shields the stray light by arranging a light shielding sheet between the plurality of the lens elements.

SUMMARY OF THE INVENTION

However, the imaging lens disclosed in the Patent Document 1 is only capable of shielding the lights on a surface part of a lens edge part, it is not enough for shielding the stray lights passing through inside of the lens and being reflected.

The present invention has been made in view of the above-described problems, and an object of the present invention is to provide an optical element capable of controlling reflection of a stray light on a surface part and inside thereof by providing a light shielding configuration inside the optical element, and to provide an imaging lens using the optical element.

In order to achieve the above object of the present invention, an optical element according to the present invention is the optical element made of a resin material and comprising an effective optical portion and an edge part formed at the circumference of the effective optical portion, and comprises a light shielding area inside of the edge part, or from the surface to the inside of the same.

In order to achieve the above object of the present invention, an imaging lens according to the present invention is the optical element made of a resin material and comprising an effective optical portion and an edge part formed at the circumference of the effective optical portion, and comprises an optical element having the light shielding area inside of the edge part, or from a surface to inside of the same.

Effect of Invention

According to the present invention, it is possible to form a light shielding area at a required area inside the optical element made of the resin material when necessary, therefore, reflection of stray lights at a surface part of the optical element and inside of the optical element can be controlled, and ghosts and flares are reduced.

An optical element according to the present invention has a configuration which a light shielding configuration is provided at an edge part surrounding the circumference of an effective optical portion, or from a surface part to the inside of the same, or inside of the same, thereby can shield not only the unnecessary lights reflected on the surface of the optical element but the unnecessary lights reflected inside the optical element.

The above-mentioned light shielding area is formed by laser irradiation to the edge part. The part which the laser irradiation is made produces heat, foams and is carbonized, thereby changes in quality and color. In recent years, various devices using such principle and capable of applying fine processing and marking have been developed and commercially available.

Such laser irradiation device is known for using a flat-bed method in which a head of the device moves toward a X-Y direction and irradiates a preliminary positioned work with a laser light, or a galvano method in which a laser irradiation point is changed by moving a mirror in a X-Y direction at high speed against the preliminary positioned work.

The above-mentioned laser irradiation device generates a wavelength from about 365 nm in the ultraviolet region to about 1064 nm in the infrared region, and the proper wavelength can be selected from various ones depending on the use. A spot of the laser light of the irradiation may have a relative wide diameter from 1 μm or less to several tens μm. Furthermore, an output of the laser irradiation also can be adjustable depending on the use. When the output is reduced, carbonization is suppressed, on the other hand, when the output is raised, the carbonization is promoted. Therefore, change of the color can be controlled from a soft color to a dark color.

An altered part made by the laser irradiation may be formed only on a surface part of a base material, or from the surface to the inside of the same, or only inside the base material.

Accuracy of the base material is maintained after laser irradiation, an optical characteristic as the optical element is maintained and shape accuracy of the edge part is also maintained.

According to the present invention, the above-mentioned laser irradiation device is used for the optical element, and unnecessary lights passing through the optical element is shielded by forming the altered part (hereinafter, referred to as a light shielding area) inside the edge part of the optical element.

DETAILED DESCRIPTION OF THE PREFERRED EMBODIMENT

Hereinafter, the preferred embodiment of the present invention will be described in detail referring to the accompanying drawings.

Figure 1:
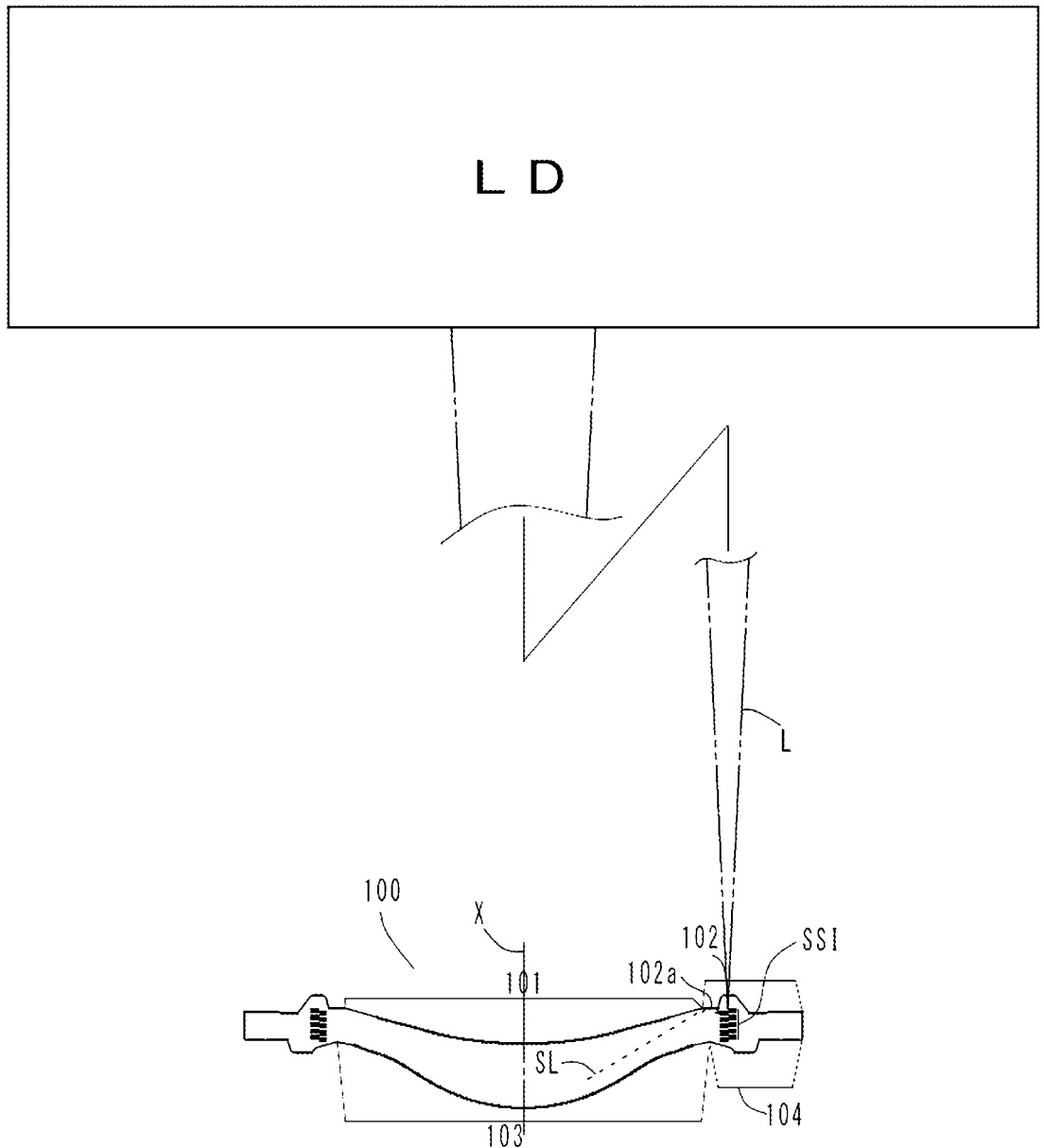
FIG. 1 is a diagram of an optical element according to an embodiment of the present invention.

FIG. 1 shows an optical element according to the present invention.

As shown in FIG. 1, an effective optical portion (lens part) is the effective optical portion 101 to which an effective light enters and the effective optical portion 103 from which the effective light exits. An edge part 102 is integrally formed at the circumference of an entrance surface 101 for surrounding the entrance surface 101, and an edge part 104 is integrally formed at the circumference of an exit surface 103 for surrounding the exit surface 103. An optical element 100 is mounted on a positioning jig (not shown), and a laser irradiation device LD is disposed above an optical axis X with a fixed distance.

A light shielding area SSI is obtained by irradiating an inside of the edge part of the optical element 100 where the light shielding is necessary with the laser L. When the irradiation with the laser L is made, irradiated part produces heat, foams and is carbonized, thereby changes in quality. Such part changing in quality, namely an altered part becomes the light shielding area SSI capable of shielding the lights. Parameters of a distance from the irradiation point of the laser L, an output of the laser L, a shape or size of a spot and irradiation time are appropriately determined so that light shielding characteristics as required can be obtained.

For example, when the unnecessary light SL passes through inside of the optical element 100 and is reflected on a plane surface part 102a of the edge part 102 toward an outer periphery, the unnecessary light SL is shielded by the light shielding area SSI. Therefore, after the unnecessary light SL is reflected on the plane surface part 102a, light reflection is prevented from repeating on various surfaces.

Figure 2:
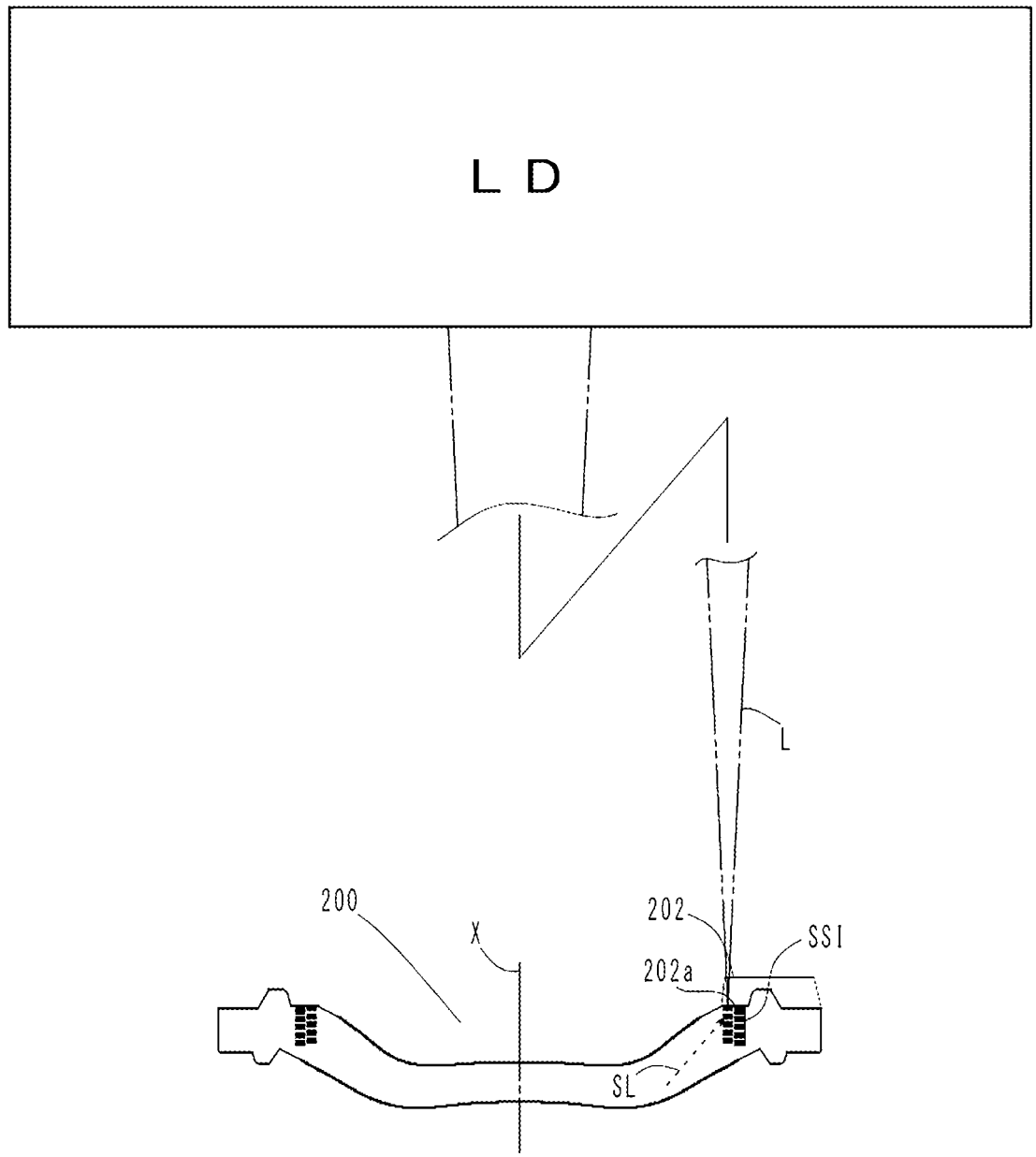
FIG. 2 is a diagram of an optical element according to an embodiment of the present invention.

FIG. 2 shows an optical element according to the present invention.

The optical element 200 of FIG. 2 is formed from a surface of a plane surface part 202a to an inside of an edge part 202 of the optical element 200 in a similar manner to FIG. 1. Herein, the unnecessary light SL toward the plane surface part 202a of the edge part 202 is shielded at the light shielding area SSI before arriving at the plane surface part 202a.

Figure 3:
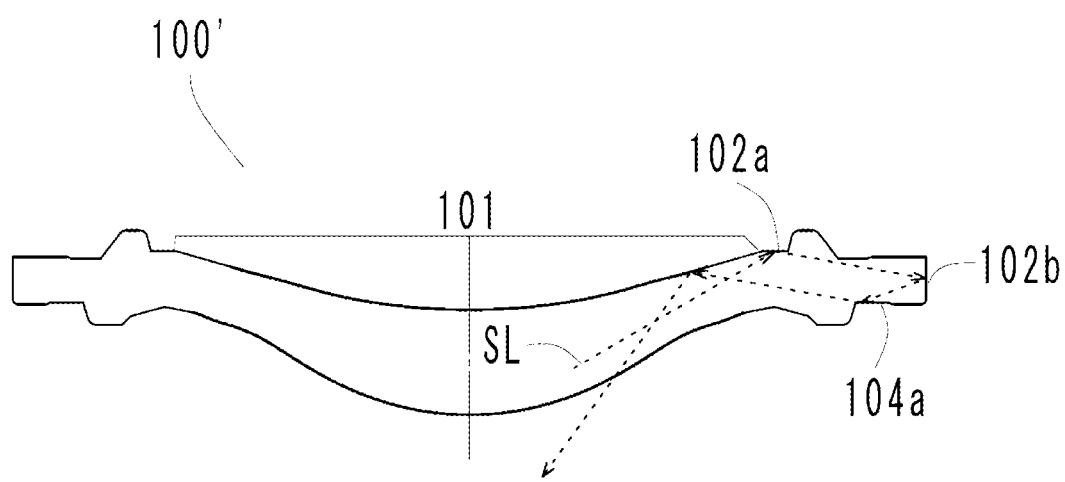
FIG. 3 is a diagram showing reflection of unnecessary lights inside a conventional optical element.

FIG. 3 shows a conventional optical element 100' before forming the light shielding area SSI in the optical element 100. When the unnecessary light SL travels from the inside of the optical element 100' to the plane surface part 102a of the edge part, the unnecessary light is reflected on the plane surface part 102a toward the outer periphery, reflected on an outermost peripheral surface 102b toward the plane surface part 104a of the edge part, reflected on the plane surface part 104a, and reflected on a surface 101 of the effective optical portion and exit outside the optical element 100'. In such a manner, If the unnecessary light SL repeating reflection inside the optical element exits and arrives at an image plane, ghosts and flares are generated and degradation of an image is occurred.

As shown in FIGS. 1 and 2, when the light shielding area SSI is formed at an appropriate position, inner reflection as shown in FIG. 3 can be prevented and the generation of the ghosts and the flares can be reduced.

The optical element 100, 100' and 200 is, for example, a single lens incorporated in the imaging lens, and made a resin material for optical use, such as cyclo olefin polymer and polycarbonate. However, the light shielding area SSI may be made of the optical element not only the resin material but optical glass material. The laser irradiation device according to the present invention adopts a galvano method, however other method is applicable depending on a condition.

Figure 4:
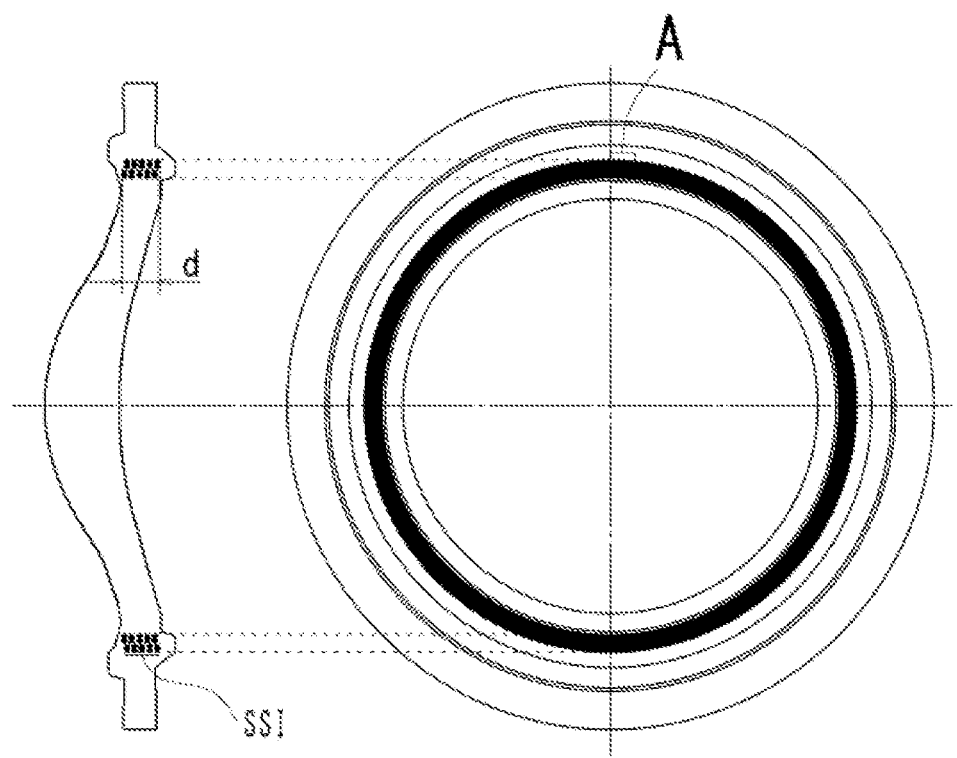
FIG. 4 shows a top view and a cross-sectional view showing the optical element according to an embodiment of the present invention.

FIG. 4 shows a top view (right side) and a cross-sectional view (left side) when the light shielding area SSI is formed in the optical element 100 of FIG. 1.

The light shielding area SSI in the optical element 100 as shown in FIG. 4 is formed in a strip-like shape on an inner surface of the edge part of the circumference of the effective optical portion.

Figure 5:
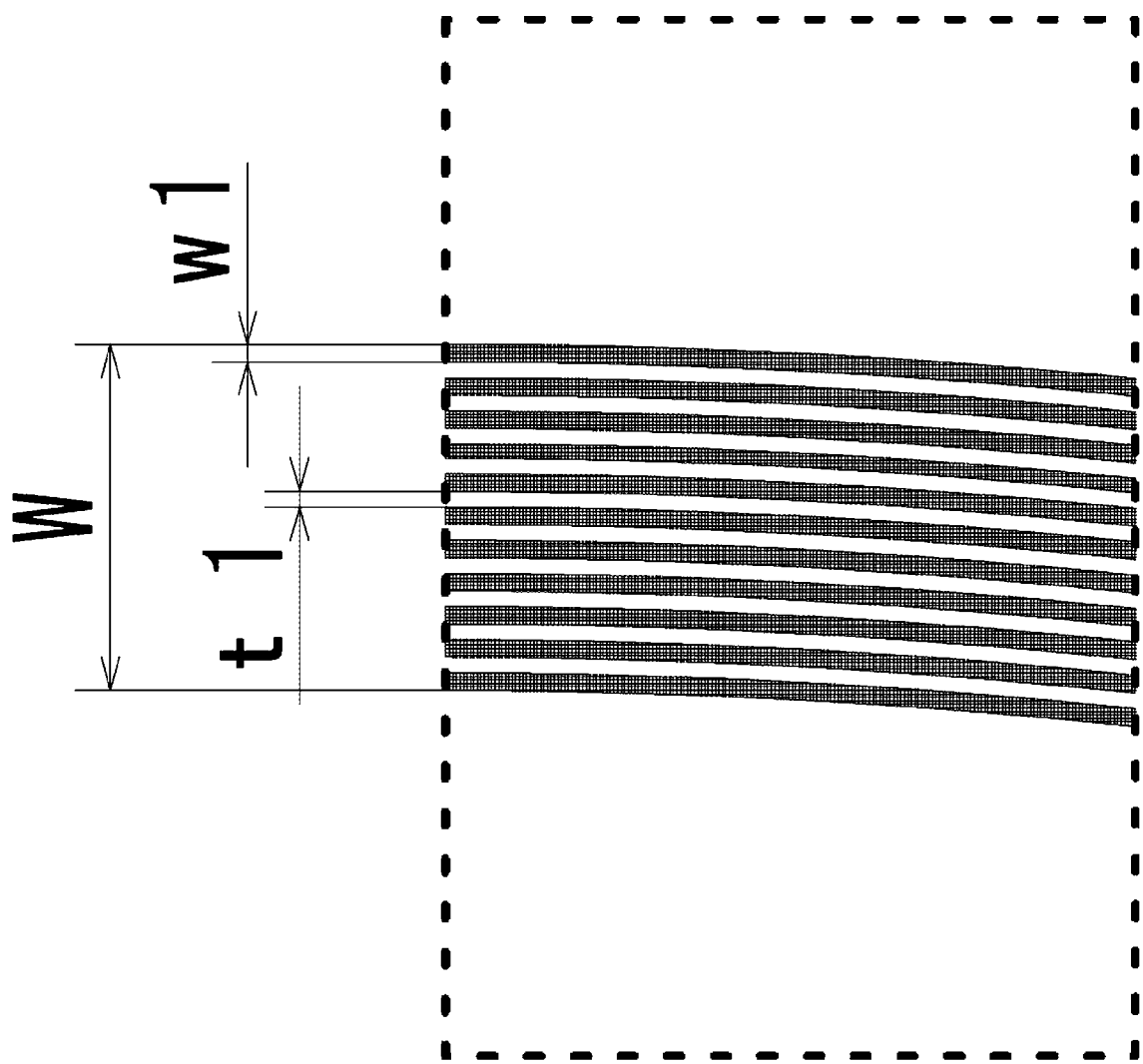
FIG. 5 is an enlarged view of a part of FIG. 4 showing an embodiment of the light shielding area.
Figure 6:
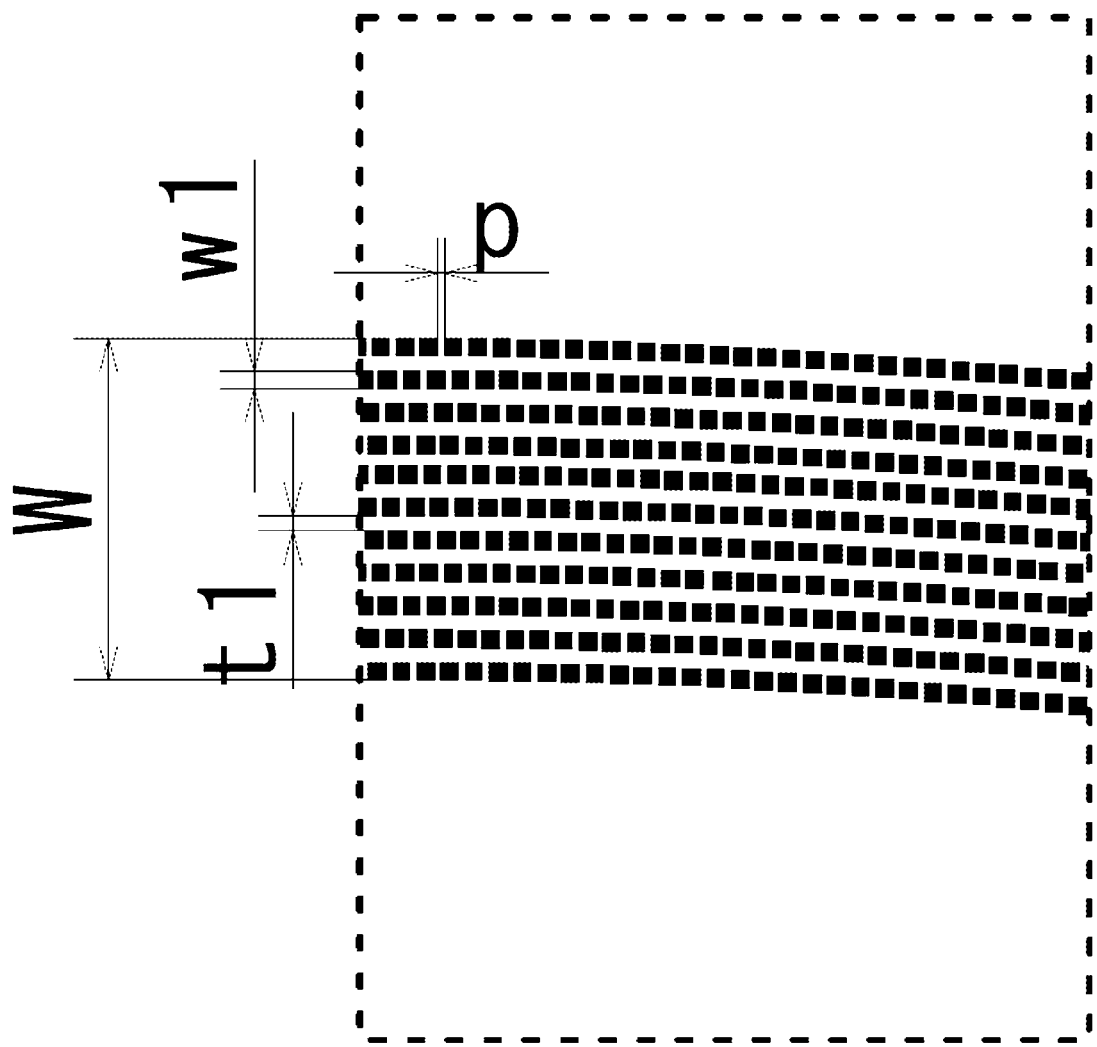
FIG. 6 is an enlarged view of a part of FIG. 4 showing an embodiment of the light shielding area.

FIGS. 5 and 6 show an enlarged view of FIG. 4A, and a diagram showing a pattern of a shape composing the light shielding area SSI.

FIG. 5 shows an example of the light shielding area SSI formed by a plurality of ring zones continuing in the circumferential direction inside the edge part. In such example, setting is made so that a ring zone width w1 is 5.0 μm and an interval t1 between adjacent ring zones is 4.5 μm, and the total width W is 100 μm. Furthermore, a depth d of the ring zone in a cross-sectional direction is about 0.2 to 0.3 mm. The light shielding area SSI having annular ring zones is obtained by irradiation with the laser light L concentrically or in a spiral manner.

FIG. 6 shows an example of the light shielding area SSI formed by a plurality of ring zones continuing in a circumferential direction inside the edge part. The light shielding area SSI is obtained by irradiation with the laser light L intermittently so that a size w1 of a dot becomes 5.0 μm and an interval p of dots in the circumferential direction becomes 2.5 μm. An interval w1 between adjacent ring zones is set to 4.5 μm, the total width W is set to 100 μm, and a total depth in a cross-sectional direction is set to about 0.2 to 0.3 mm. The light shielding area SSI having annular ring zones is obtained by irradiation with the laser light L concentrically or in a spiral manner. The dot-like and intermittent irradiation achieves forming uncarbonized resin material areas while being joined, and it is effective to prevent from reducing mechanical strength.

As shown in FIGS. 5 and 6, the configuration of the light shielding area SSI, namely a shape of carbonization by the laser light L includes the annular ring zones having the planar continuity, or intermittent annular ring zones. Furthermore, the depth in the cross-sectional direction can be freely determined. These shape or depth can be controlled by incorporating an irradiation program into the device, for example, a grid-like structure or a stagger-like structure is available. In addition, a color after the carbonization can be controlled by appropriately adjusting an output of the laser light L in the irradiation program. In the above-mentioned embodiments, the width w of the ring zone and the size of the dot after the irradiation is set to 5.0 μm, however, sub-micron precision such as 0.1 μm or 0.2 μm is also available depending on purposes.

Figure 7:
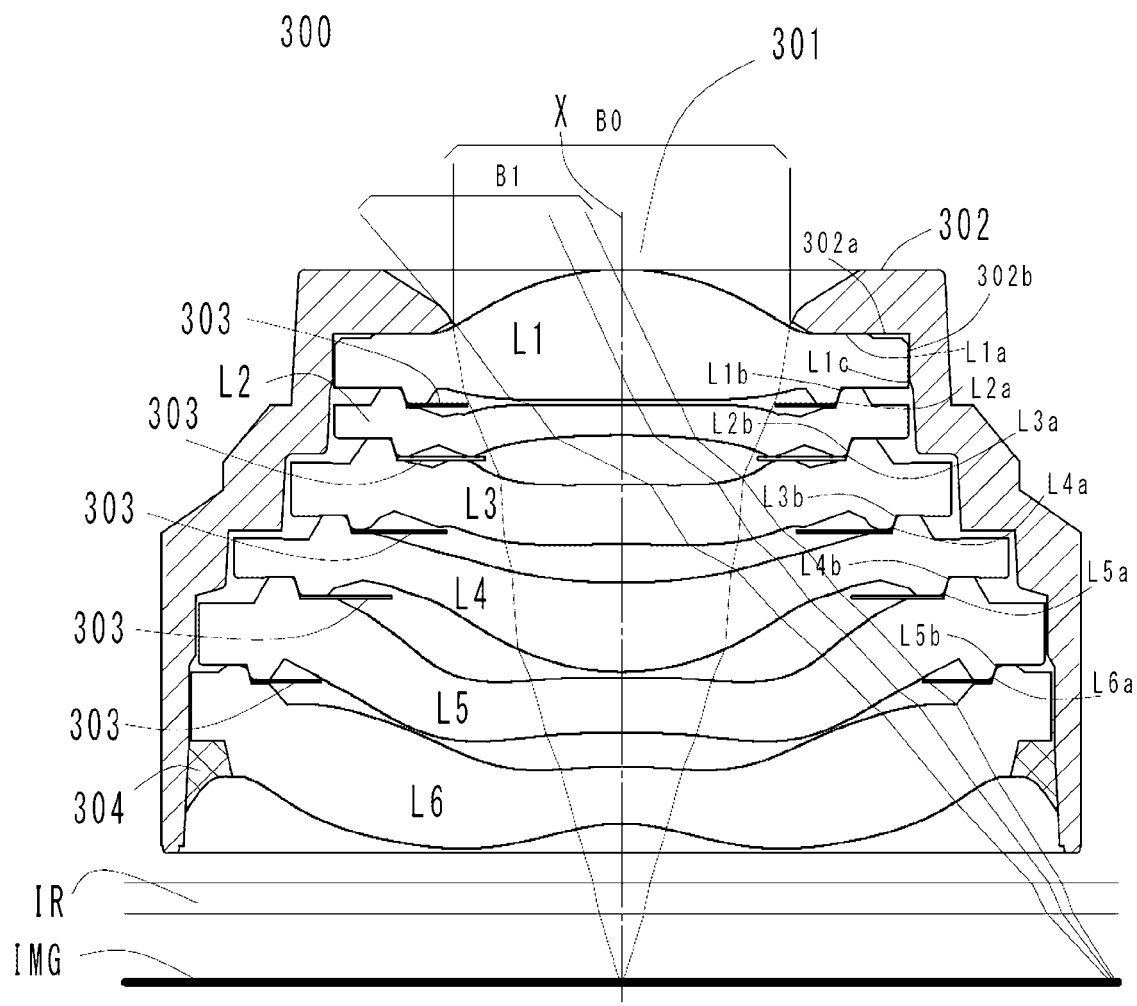
FIG. 7 is a cross-sectional view showing a common imaging lens.

FIG. 7 shows a cross section of the conventional imaging lens 300 comprising six optical elements. The imaging lens is housed with a lens assembly 301 comprising, in order from an object side (upper direction of Figure) to an image sensor IMG side (lower direction of Figure), a first lens L1, a second lens L2, a third lens L3, a fourth lens L4, a fifth lens L5 and a sixth lens L6 inside the barrel 302. An outer peripheral part of the edge part of the sixth lens L6 located closest to the image sensor IMG side and an inner peripheral part of the barrel 302 are fixed with an adhesive 304 each other, and the imaging lens 300 is competed. As a lens material for forming each optical element, a resin for optical use such as cyclo olefin polymer and polycarbonate is used.

The imaging lens 300 is used for the compact imaging lens mounted in a smartphone and mobile phone. A filter IR such as an IR cut filter is arranged on the image sensor IMG side of the imaging lens 300, and after the filter IR, the image sensor IMG such as CCD sensor or C-MOS sensor is disposed. A camera module is configured to package the imaging lens 300, the filter IR and the image sensor IMG.

Each lens comprises the effective optical portion (lens part) and the edge part formed at the circumference of the effective optical portion. The edge part of each lens is provided with a protrusion for fitting an adjacent lens. The protrusion has an approximately trapezoidal shape which is formed with a conical inclined plane and a plane surface part connected to the inclined plane.

Centering of the first lens L1 and the second lens L2 is made by fixing an inclined plane L1b of the first lens L1 and an inclined plane L2a of the second lens L2. Centering of the second lens L2 and the third lens L3 is made by fixing an inclined plane L2b of the second lens L2 and an inclined plane L3a of the third lens L3. Centering the third lens L3 and the fourth lens L4 is made by fixing an inclined plane L3b of the third lens L3 and an inclined plane L4a of the fourth lens L4. Centering the fourth lens L4 and the fifth lens L5 is made by fixing an inclined plane L4b of the fourth lens L4 and an inclined plane L5a of the fifth lens L5. Centering the fifth lens L5 and the sixth lens L6 is made by fixing an inclined plane L5b of the fifth lens L5 and an inclined plane L6a of the sixth lens L6. Thus configured, the lens assembly 301 obtains a condition which centers of the first lens L1 to the sixth lens L6 coincide with an optical axis X.

Additionally, an interval of lenses is determined by contacting the plane surface part connected to the inclined plane of the protrusion of the edge part of each lens to the plane surface part of the edge part of the adjacent lens.

Therefore, the lens assembly 301 achieves an alignment of the optical axis X and positioning of an axis direction only by superposing each lens When the above-described lens assembly 301 is stored in the barrel 302, the plane surface part L1a of the first lens L1 contacts a receiving surface 302a which is perpendicular to the optical axis X and formed on an inner surface of the barrel 302, and positioning the direction of the optical axis X is made. When an outermost peripheral part L1c of the edge part of the first lens L1 is fixed to an inner surface 302b of the barrel 302, a center of the lens assembly 301 and the center of the barrel 302 are coincide with the optical axis X. Thereafter, an outer peripheral part of the edge part of the sixth lens L6 and the inner surface of the barrel 302 are fixed with the adhesive 204, and the imaging lens is completed. Size of the outermost peripheral part of the edge part of the second lens L2 to the sixth lens L6 is determined as smaller than an inner diameter of the barrel so that accuracy of the positioned lens assembly 301 is maintained.

A light shielding plate 303 is arranged between each lens. The light shielding plate 303 is made of a light shielding member is made from an annular plate having an opening at a center. A diameter of the opening has a minimum size which does not disturb passage of luminous flux B0 being effective lights entering the imaging lens 300 which forms an image on the optical axis X and luminous flux B1 of lights entering at the maximum view angle and forming the image with a maximum image height, and lights entering from outside of the luminous flux B1 is shielded. The light shielding plate 303 is used for shielding the unnecessary light other than the effective lights.

Next, an optical element according to the present invention will be described regarding embodiments using the imaging lens 300.

Figure 8A:
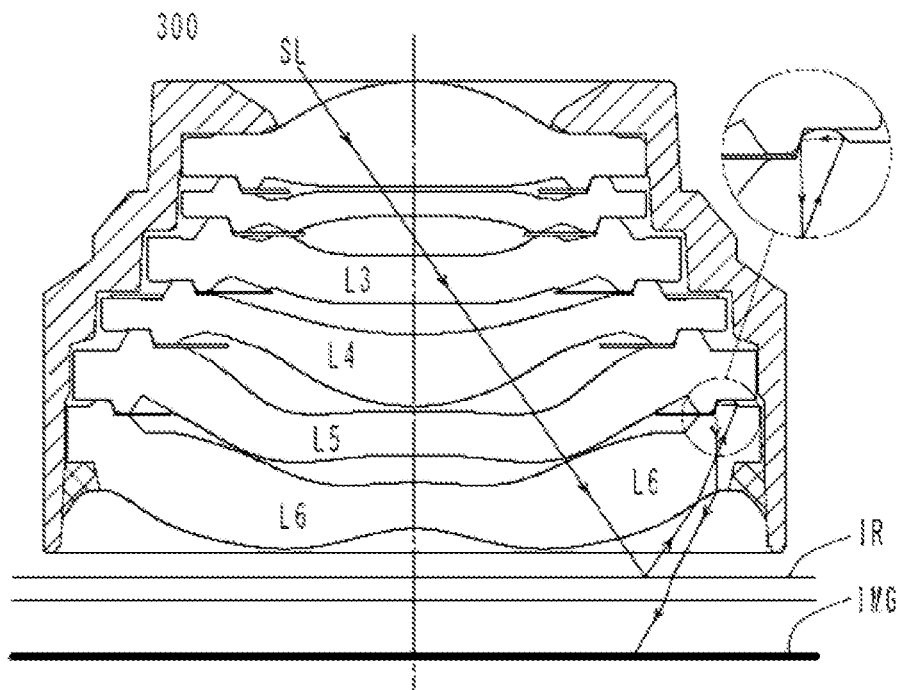
FIG. 8A shows an unnecessary light occurring inside the imaging lens of FIG. 7.
Figure 8B:
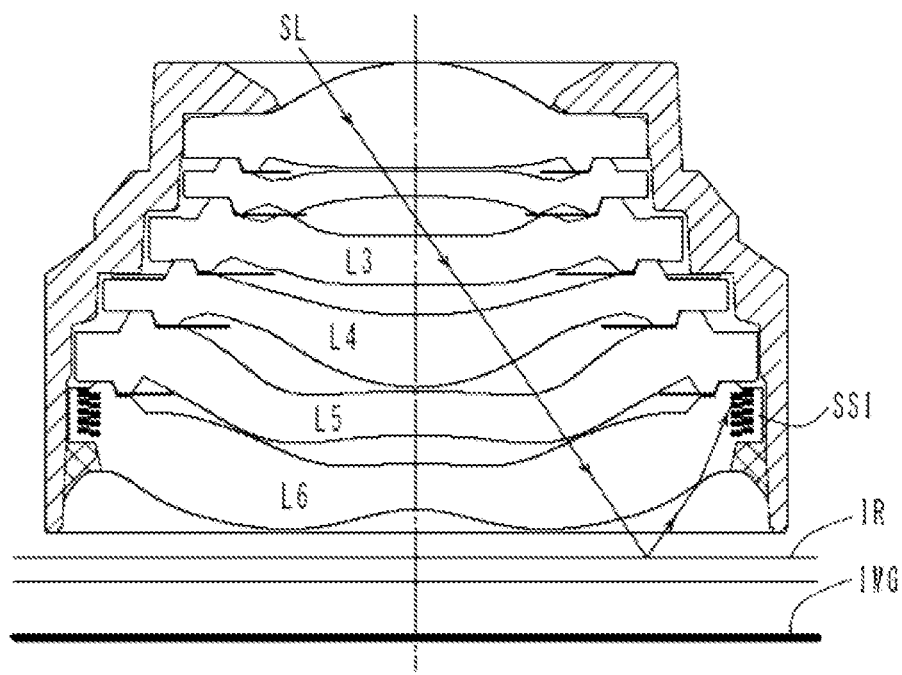
FIG. 8B shows an embodiment which the optical element according to the present invention is applied to the imaging lens of FIG. 8.

FIG. 8A shows a condition that the unnecessary light is occurred in the imaging lens 300 of FIG. 7, and FIG. 8B shows a condition that the unnecessary light is shielded using the optical element according to the present invention.

FIG. 8A shows a condition that the unnecessary light SL passes through the imaging lens 300, is reflected on a surface of the filter IR and enters the sixth lens L6, after that, is reflected by the edge part on a subject side of the sixth lens L6 and returns to the image sensor IMG side, passes through the filter IR and arrives at the image sensor IMG. The unnecessary light SL arriving at the image sensor IMG causes the ghosts and the flares appearing on the image, therefore the image quality becomes degraded.

FIG. 8B shows a condition that the light shielding area SSI is formed inside the edge part of the sixth lens L6 of the imaging lens 300 of FIG. 8A, and the optical element according to the present invention is adopted in the imaging lens. As shown in FIG. 8B, the unnecessary light SL reflected from the filter IR enters the sixth lens L6, and after that, is shielded by the light shielding area SSI, and is stopped without traveling any more. Therefore, the unnecessary light SL never arrives at the image sensor IMG.

Figure 9A:
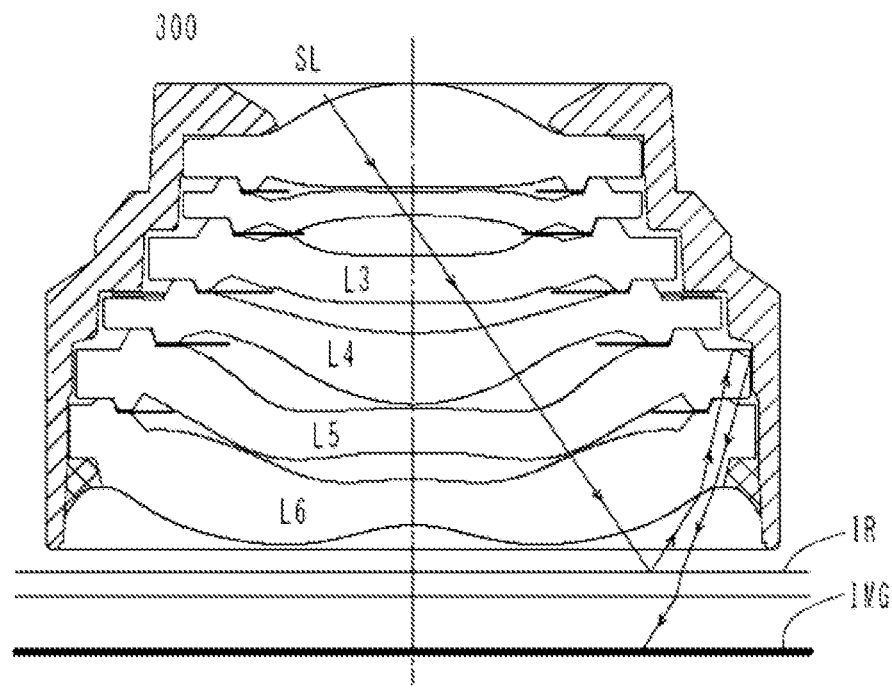
FIG. 9A shows an unnecessary light occurring inside the imaging lens of FIG. 7.

FIG. 9A shows a condition that the unnecessary light SL passes through the imaging lens 300, is reflected on a surface of the filter IR and enters the sixth lens L6, after that, passes through the edge part on a subject side of the sixth lens L6 and enters the edge part of the fifth lens L5, is reflected by the edge part on the subject side of the fifth lens L5, is further reflected on an outer peripheral surface of the edge part and returns to the image sensor IMG side, passes through the sixth lens L6 and the filter IR and arrives at the image sensor IMG. The unnecessary light SL arriving at the image sensor IMG causes the ghosts and the flares appearing on the image, therefore the image quality becomes degraded.

Figure 9B:
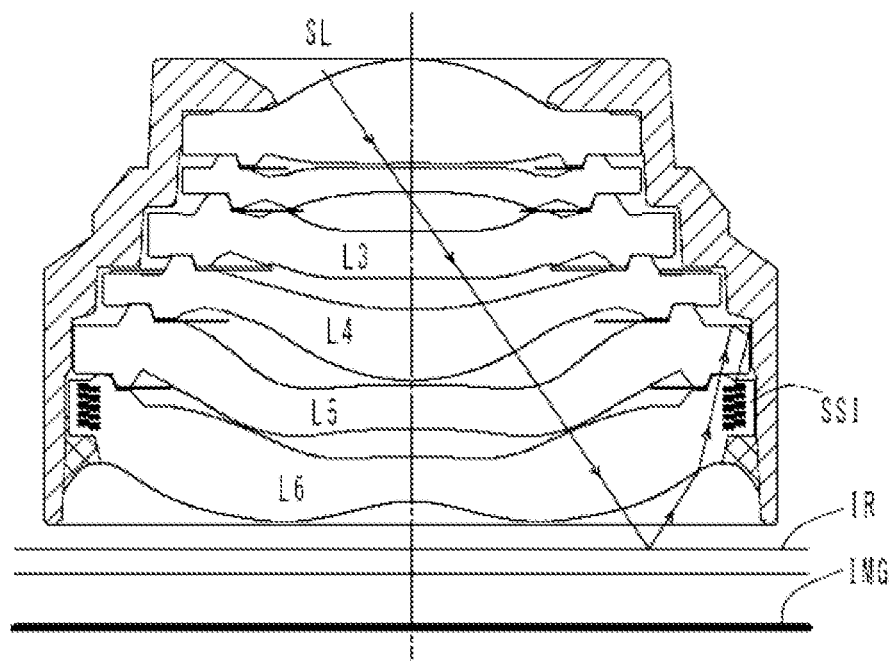
FIG. 9B shows an embodiment which the optical element according to the present invention is applied to the imaging lens of FIG. 8.

FIG. 9B shows a condition that the light shielding area SSI is formed inside the edge part of the sixth lens L6 of the imaging lens 300 of FIG. 9A, and the optical element according to the present invention is adopted in the imaging lens. As shown in FIG. 9B, the unnecessary light SL is reflected on a surface of the filter IR and enters the sixth lens L6, and after that, passes through the edge part on the subject side of the sixth lens L6 and is reflected on the edge part on the subject side of the fifth lens L5 and on the outer peripheral surface of the edge part, and returns to the edge part of the sixth lens L6. After entering the sixth lens L6, the unnecessary light SL is shielded by the light shielding area SSI and is stopped without traveling any more. Therefore, the unnecessary light SL never arrives at the image sensor IMG.

Figure 10A:
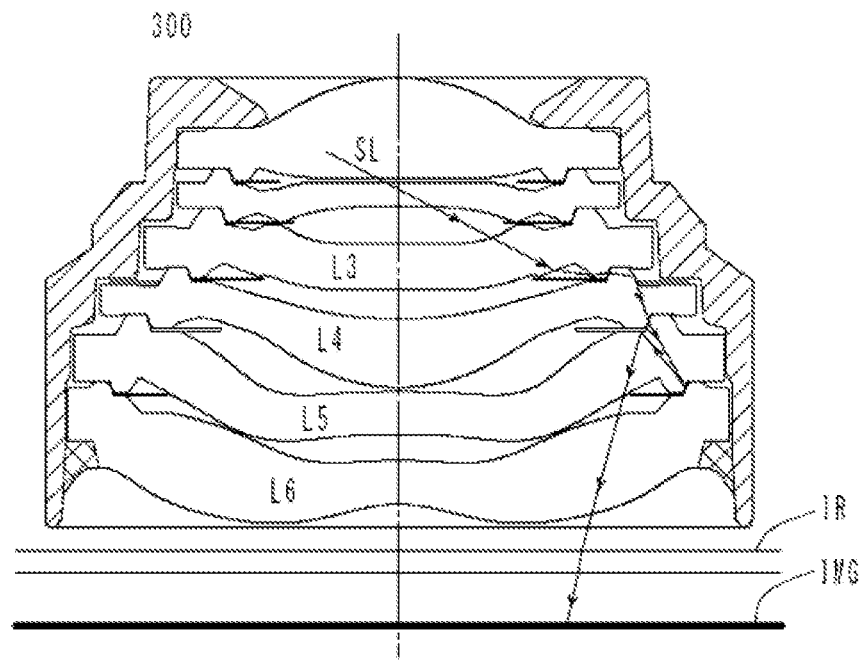
FIG. 10A shows an unnecessary light occurring inside the imaging lens of FIG. 7.

FIG. 10A shows a condition that the unnecessary light SL occurred inside the imaging lens 300 passes through the edge part of each lens and arrives at the image sensor IMG. The unnecessary light SL which passed through the edge part on the image sensor IMG side of the third lens L3 passes through the fitting part of the third lens L3 and the fourth lens L4, is reflected on the outer inclined plane of the fitting protrusion of the fourth lens L4, passes through the fitting part of the fourth lens L4 and the fifth lens L5, is reflected on the fitting inclined plane on the image sensor IMG side of the fifth lens L5 and returns to the subject side, is reflected on the plane surface part of the edge part on the subject side of the fifth lens L5, and after that, passes through the sixth lens L6 and the filter IR and arrives the image sensor IMG. The unnecessary light arriving the image sensor IMG causes the ghosts and the flares appearing on the image, therefore the image quality becomes degraded.

Figure 10B:
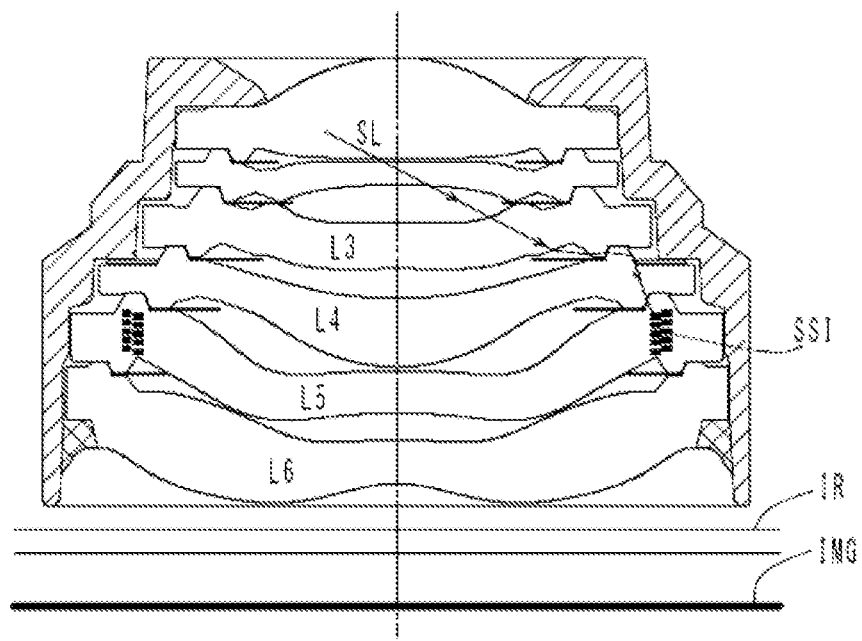
FIG. 10B shows an embodiment which the optical element according to the present invention is applied to the imaging lens of FIG. 8.

FIG. 10B shows a condition that the light shielding area SSI is formed inside the edge part of the fifth lens L5 of the imaging lens 300 of FIG. 9A, and the optical element according to the present invention is adopted in the imaging lens. As shown in FIG. 10B, the unnecessary light SL which passed through the edge part on the image sensor IMG side of the third lens L3 passes through the fitting part of the third lens L3 and the fourth lens L4, is reflected on the outer inclined plane of the fitting protrusion of the fourth lens L4, passes through the fitting part of the fourth lens L4 and the fifth lens L5, however shielded by the light shielding area SSI formed inside the edge part of the fifth lens L5, and is stopped without traveling any more. Therefore, the unnecessary light SL never arrives at the image sensor IMG.

As mentioned above, the optical element according to the present invention, and imaging lens using the optical element is capable of effectively preventing from occurring the ghosts and the flares by forming the light shielding area for shielding the unnecessary light at an appropriate position inside the edge part formed at the circumference of the effective optical portion.

In the above-mentioned embodiments, the light shielding area is formed inside the edge part of a single lens in the imaging lens comprising a plurality of lenses, however it is not limited thereto. The light shielding area may be formed inside the plurality of the edge parts of the imaging lens comprising a plurality of lenses, and be adopted to a device comprising one optical element. Furthermore, light shielding area can be used only on the surface, not only from the surface to the inside, or the inside of the edge part. In this case, it can be replaced with the light shielding plate as a structural member of the imaging lens.

According to the present invention, reflection inside the optical element can be effectively shielded and the optical characteristics and quality are improved when the present invention is adopted to the imaging device requiring high image quality.

DESCRIPTION OF REFERENCE NUMERALS

LD: laser irradiation device
L: laser light
100, 100', 200: optical element
101, 103: effective optical portion (lens part)
102, 102a, 102b, 202, 202a, 104: edge part
SSI: light shielding area
SL: unnecessary light
X: optical axis
300: imaging lens
301: lens assembly
302: barrel
303: light shielding plate
304: adhesive
L1: first lens,
L2: second lens,
L3: third lens,
L4: fourth lens,
L5: fifth lens,
L6: sixth lens,
L1b, L2a, L2b, L3a, L3b, L4a, L4b, L5a, L5b, L6a: lens fitting part
IR: filter
IMG: image sensor
B0: effective luminous flux on the optical axis
B1: effective luminous flux of high image height

What is claimed is:

1. An optical element comprising an effective optical portion and an edge part formed at a circumference of said effective optical portion, wherein a light shielding area is provided inside of said edge part or from a surface to the inside of said edge part,
wherein said light shielding area is formed with an altered part in which a base material changes in quality.

2. The optical element according to claim 1, wherein said altered part is formed continuously and linearly.

3. The optical element according to claim 1, wherein said altered part is formed like dot-shape and intermittently with an interval.

4. The optical element according to claim 2, wherein said altered part is formed all over a circumference of said effective optical portion.

5. The optical element according to claim 2, wherein a width of a line of said altered part formed continuously and linearly is 0.2 μm or more.

6. The optical element according to claim 3, wherein size of a dot of said altered part formed like dot-shape and intermittently with an interval is 0.2 μm or more.

7. An imaging lens comprising an optical element according to claim 1.

8. The optical element according to claim 3, wherein said altered part is formed all over a circumference of said effective optical portion.

9. An imaging lens comprising an optical element according to claim 1.

10. An imaging lens comprising an optical element according to claim 2.

11. An imaging lens comprising an optical element according to claim 3.

12. An imaging lens comprising an optical element according to claim 4.

13. An imaging lens comprising an optical element according to claim 5.

* * * * *